United States Patent [19]

Bunnelle

[11] Patent Number: 4,903,471
[45] Date of Patent: Feb. 27, 1990

[54] SHAKING METHOD AND APPARATUS FOR MOVING MASSES BETWEEN BALANCED AND UNBALANCED POSITIONS WHILE ROTATING

[75] Inventor: Philip R. Bunnelle, Santa Clara, Calif.

[73] Assignee: FMC Corporation, Chicago, Ill.

[21] Appl. No.: 221,957

[22] Filed: Jul. 8, 1988

[51] Int. Cl.⁴ .............................................. A01D 46/26
[52] U.S. Cl. ................................................... 56/340.1
[58] Field of Search ...................... 56/340.1, 330, 328.1

[56] References Cited

U.S. PATENT DOCUMENTS

| 3,564,825 | 2/1971 | Gould et al. | 56/340.1 |
| 3,964,244 | 6/1976 | Vallecella | 56/329 |
| 4,194,347 | 3/1980 | Peters | 56/340.1 |
| 4,776,156 | 10/1988 | Brown et al. | 56/340.1 |

FOREIGN PATENT DOCUMENTS

| 816421 | 3/1981 | U.S.S.R. | 56/340.1 |
| 858637 | 8/1981 | U.S.S.R. | 56/340.1 |

OTHER PUBLICATIONS

American Society of Agricultural Engineers Article, Paper No. 87-1576 by H. A. Affeldt, Jr., G. K. Brown, J. B. Gerrish and T. A. Esch, 12/1987.

Primary Examiner—Jerome W. Massie, IV
Assistant Examiner—David J. Bagnell
Attorney, Agent, or Firm—A. J. Moore; R. C. Kamp; R. B. Megley

[57] ABSTRACT

A variable force tree shaker is disclosed which includes a non-rotatable housing having a two-piece shaft journaled therein. A fixed weight is rigidly connected to the shaft and an adjustable weight is pivotally connected to the shaft. At least one hydraulic cylinder is formed in the fixed weight and receives a piston which is connected to the adjustable weight by a piston rod. While the shaft is driven, an hydraulic controller directs hydraulic fluid into said at least one piston which moves the adjustable weight between a balanced position diametrically opposed to the fixed weight providing no shaking forces to the shaft, and a plurality of unbalanced positions imparting shaking forces of different intensities to the shaft.

24 Claims, 7 Drawing Sheets

FIG_1

FIG_2

FIG_3

FIG_11

FIG_12

FIG_10

FIG_14

FIG_13

FIG_15

FIG_16

SHAKING METHOD AND APPARATUS FOR MOVING MASSES BETWEEN BALANCED AND UNBALANCED POSITIONS WHILE ROTATING

BACKGROUND OF THE INVENTION

1. Field of the Invention

The present invention relates to variable force shakers and more particularly relates to a tree shaker having a fixed weight and an adjustable weight, which adjustable weight may be moved accurately between a balanced position diametrically opposed to the fixed weight which results in no shaking when rotated; and a plurality of unbalanced positions which provides variable shaking forces of a plurality of desired magnitudes.

1. Description of the Prior Art

Mobile tree shakers for harvesting fruit or nuts (produce) from trees are well known in the art. Assignee's U.S. Pat. No. 4,194,347 to Peters discloses a conventional mobile tree shaker; and U.S. Pat. No. 3,964,244 to Vallicello discloses a mobile tree shaker having wings for collecting the fruit or nuts shaken from the trees.

The above conventional tree shakers include a shaking assembly which is clamped to the trunk or limbs of a tree for shaking fruit or nuts therefrom. The above prior art shakers include two imbalanced, non-adjustable counterrotating counterweights which are rigidly secured to shafts which apply shaking forces to either the trunk or limbs of a tree as soon as the shafts start to rotate and continue to shake the tree until rotation is stopped. The tree shaker system has a low natural frequency which results in large excursions or amplitudes of shake at the start and end of each shake. These excursions are potentially damaging both to the bark and to the tree system. By having the shaker heads in balance while passing through these frequencies, the problem can be avoided.

Furthermore, it is possible to harvest with the shaker heads rotating continuously, which will save time and fuel. Additional benefits will also be gained when harvesting soft fruit.

When harvesting soft fruit with the prior art fixed eccentricity tree shakers, the fruit is typically detached in several short violent bursts. During the start and at the end of each burst, high amplitude excursions occur, which result in substantial damage to undetached fruit which hit limbs or other undetached fruit. Also, if one-third to one-half of the total crop is detached in a period of one or two seconds due to the violent burst, considerable damage results from fruit landing on other fruit in well known catch frames.

This design would also lend itself to on-board computer control, where pre-established shaking patterns and frequencies could be used, or feed-back sensors to optimize the individual shake would be used.

SUMMARY OF THE INVENTION

The variable force shaker heads of the present invention will greatly reduce the above sources of damage. By starting the shake at high speeds and low amplitudes, the easier to remove produce is not subjected to large excursion and thus resulting damage before detachment. Also, the variable force shaker heads permit controlled rate of removal which minimizes the likelihood of fruit landing on fruit in a catch frame thus minimizing damage, an permits selectively harvesting of fruit when it matures during the harvest season.

The variable force shaker of the present invention includes a shaking head having a fixed eccentric mass or weight rigidly secured to a shaft; and a second eccentric mass or weight of equal WR is pivotable about the axis of the shaft. WR is the product of weight or mass times the radius to the center of gravity of the mass. With a 90° stroke total WR will vary from zero to 1.41 times the WR of one eccentric mass alone. As used in the specification and claims, the term "variable force" is intended to cover "WR". The second eccentric weight is pivotable between a balanced position diametrically opposed to the first eccentric weight at which time shaking forces are not generated when the shaft is rotating; and a plurality of unbalanced positions which provide a plurality of shaking forces of increasing magnitude as the movable weight moves away from the balanced position. By varying both speed and WR of the two shaker heads, a wide range of forces and patterns can be obtained.

The shafts may also be driven when being connected to or disconnected from a tree provided the first and second eccentric weights are in their balanced diametrically opposed positions since no shaking forces are generated at this time. The shaft may be driven at a constant speed, or a variable speed if desired, when shaking fruit from trees of different sizes in an orchard thereby saving fuel costs by avoiding the necessity of starting and stopping the shaft each time a tree or limb is being gripped and thereafter released. Moving the second eccentric weight to any one of a multiplicity of unbalanced positions while the shaft is rotating provides optimum shaking forces for different trees.

BRIEF DESCRIPTION OF THE DRAWINGS

FIG. 1 is a perspective of a portion of a tree shaker, with two shaking heads therein, shown clamped to a tree trunk, the foliage of the tree being cut away.

FIG. 2 is a perspective of a shaking head with parts cut away to illustrate the internal components therein, the view illustrating the shaft in a horizontal position rather than the usual upright position.

DESCRIPTION OF THE PREFERRED EMBODIMENT

Figure 9:
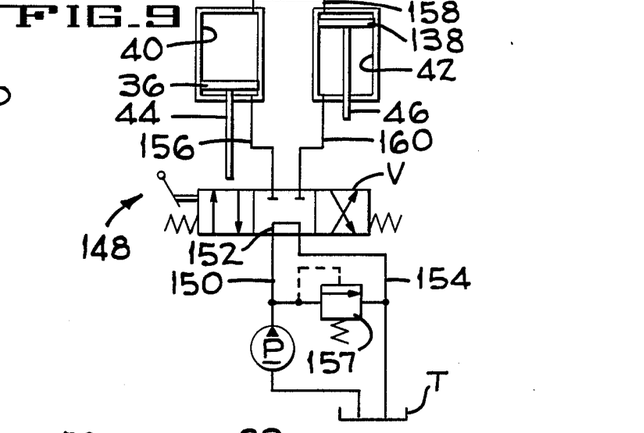
FIG. 9 is a simplified hydraulic diagram for varying the em (WR) of the shaker.

The method and apparatus of the present invention preferably uses two variable force shaking heads 20 (FIGS. 1-5) which are mounted on a clamping and shaking assembly 22 (FIG. 1) of a tree shaking vehicle (not fully shown). The tree shaking vehicle may be of the general type disclosed in Assignee's previously mentioned Peters Pat. No. 4,194,347 which includes an engine for providing power to drive the vehicle and a hydraulic pump (FIG. 9).

As shown in FIG. 1, the clamping and shaking assembly 22 includes a pair of conventional hydraulically actuated clamping and shaking jaws 24 which are shown clamped to the trunk of a tree 26 but may be elevated and rotated into positions to permit clamping onto the limbs of a big tree, all as is well known in the art. The two variable force shaker heads 20 are driven by chain drives 28 powered by the hydraulic motors M. Since the two shaking heads 20 of the present invention are identical, only one will be described in detail.

Figure 4:
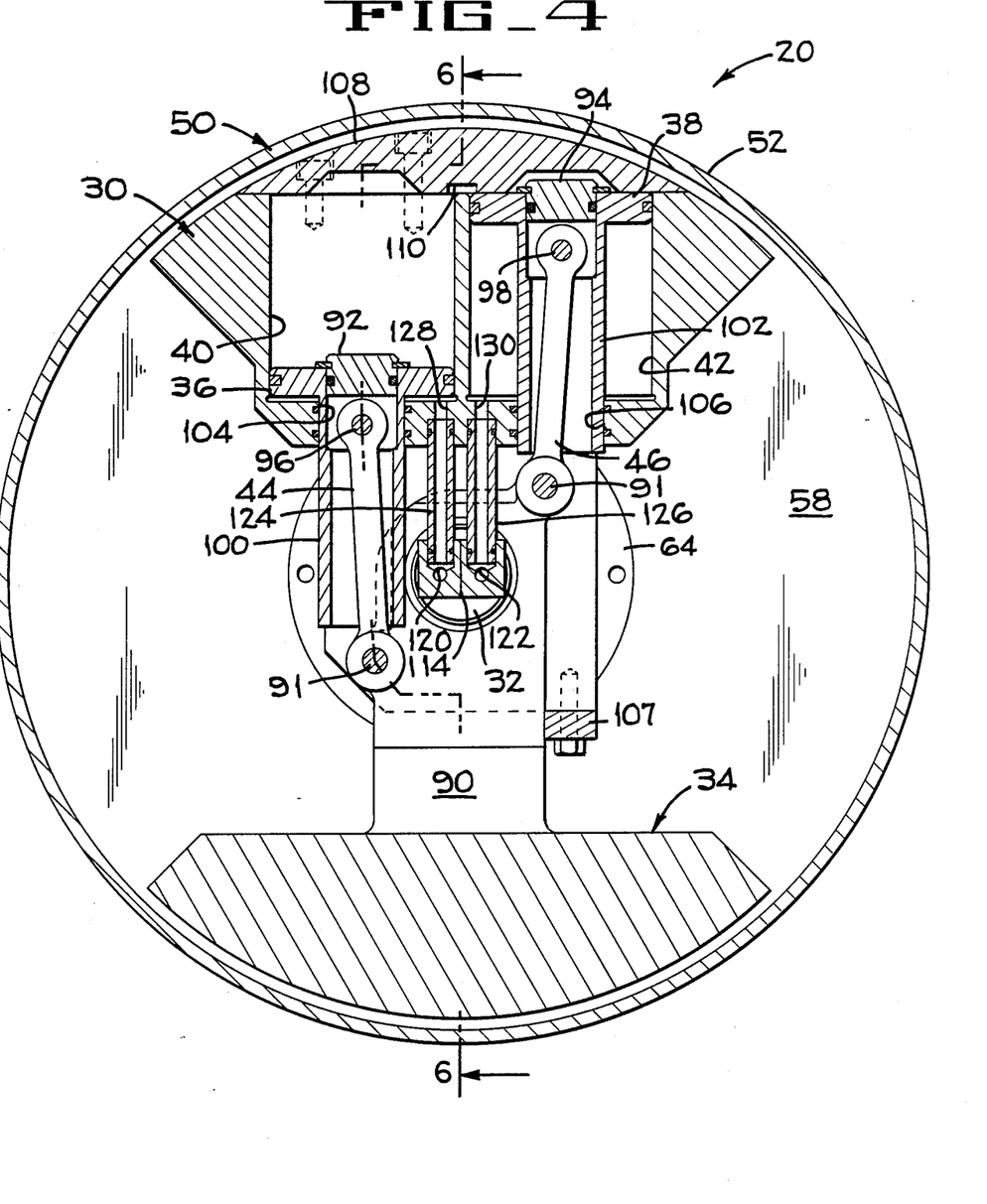
FIG. 4 is a central section taken along lines 4—4 of FIG. 3 illustrating the shape of the outer housing as being cylindrical, and illustrating the adjustable weight in a balanced position.
Figure 5:
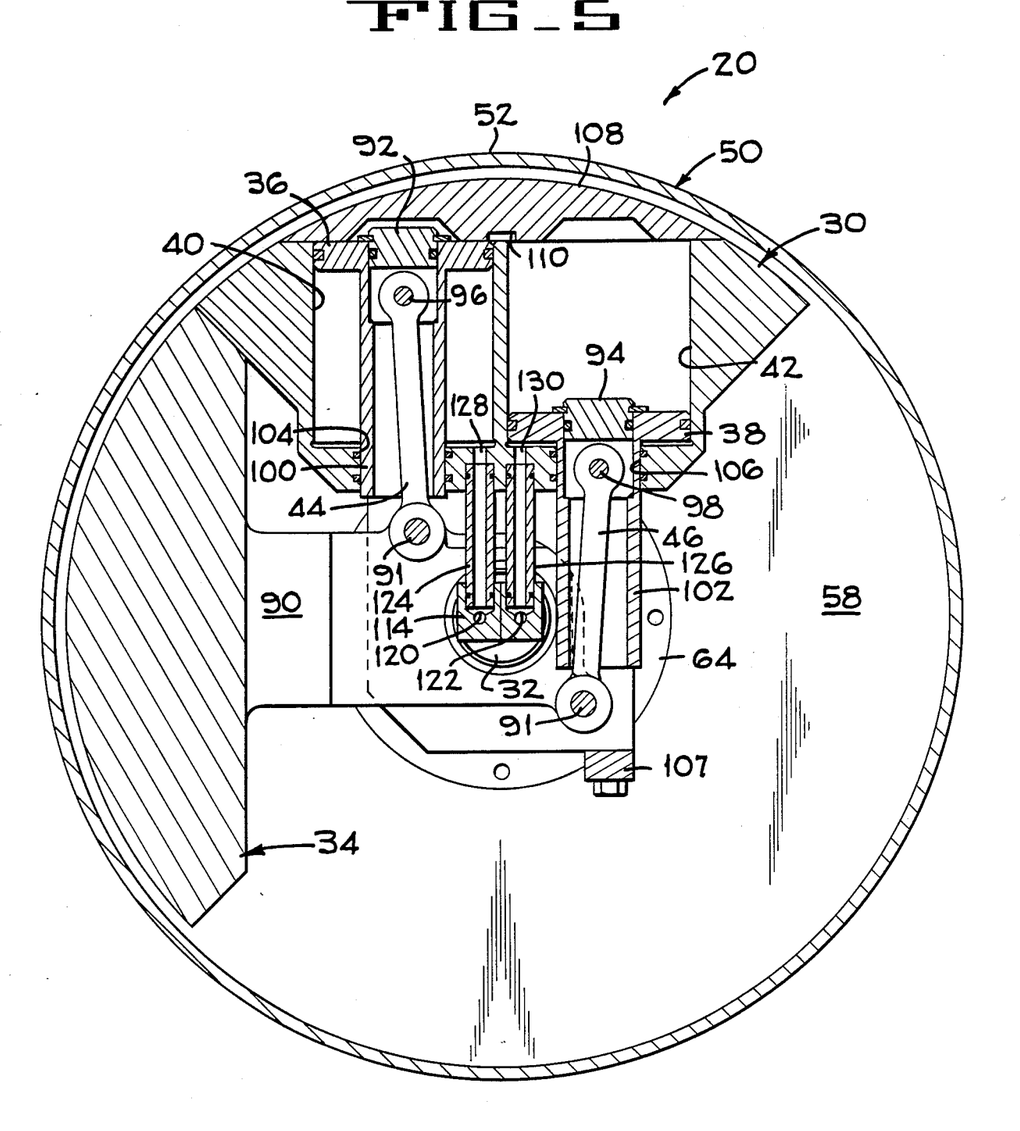
FIG. 5 is similar to FIG. 4 but illustrating the adjustable weight in a maximum imbalance position.
Figure 6:
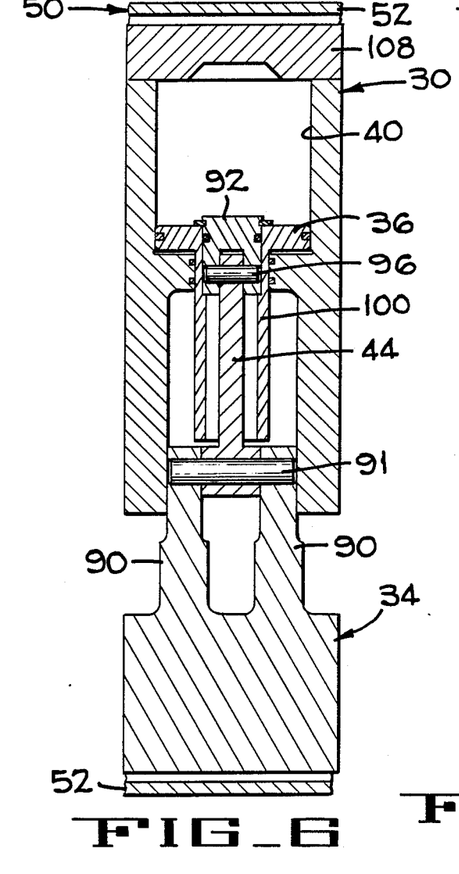
FIG. 6 is a section at a reduced scale taken along lines 6—6 of FIG. 4 illustrating the components for connecting piston to the adjustable weight.
Figure 7:
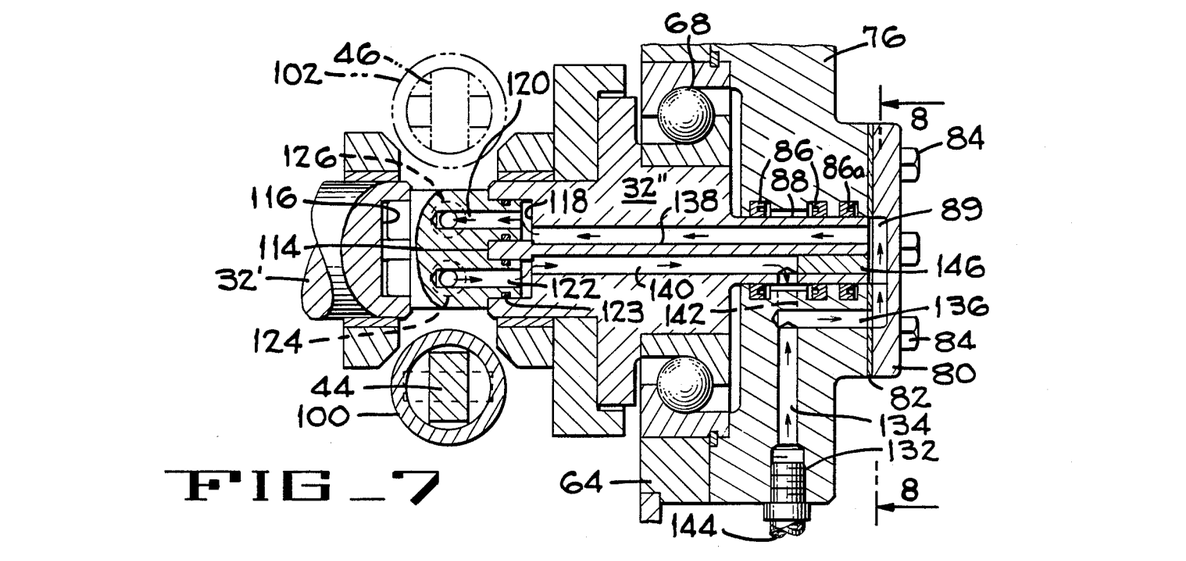
FIG. 7 is a section taken along lines 7—7 of FIG. 3 illustrating hydraulic flow passages in the two-piece shaft for directing hydraulic fluid into the cylinders.
Figure 8:
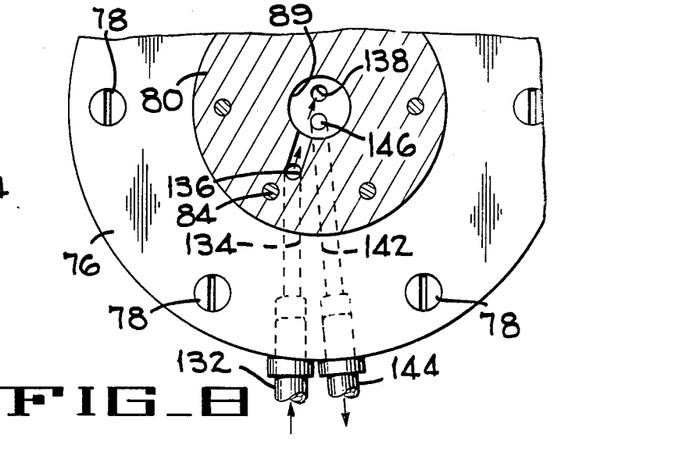
FIG. 8 is a section taken along lines 8—8 of FIG. 7 additional hydraulic flow passages.

In general, the variable force shaking head 20 (FIGS. 1-9) of the first embodiment of the invention comprises a fixed weight 30 (FIGS. 2-4) secured to a two piece shaft 32; and an adjustable weight 34 which is supported on the rotatable shaft 32 for pivotal movement about the axis A of the two piece shaft while the shaft is rotating. A pair of pistons 36,38 in the fixed weight 30 (FIGS. 3-5) are received in hydraulic cylinders 40 and 42 and are connected to the adjustable weight 34 by connecting rods 44,46, respectively. When the two piece shaft 32 is being driven, the pistons and thus the adjustable weight 34, may be pivoted to and then be stopped at any position between the balanced position of FIG. 4 and the maximum out of balance position as shown in FIG. 5. It will be understood that the WR of the fixed weight plus the hydraulic fluid therein and the mechanical components connected thereto, hereinafter referred to as "fixed weight" equals that of the movable weight 34 and its connecting arms and thus provides no shaking forces when the weights are positioned as shown in FIG. 4 when the shaft 32 is rotated.

Figure 3:
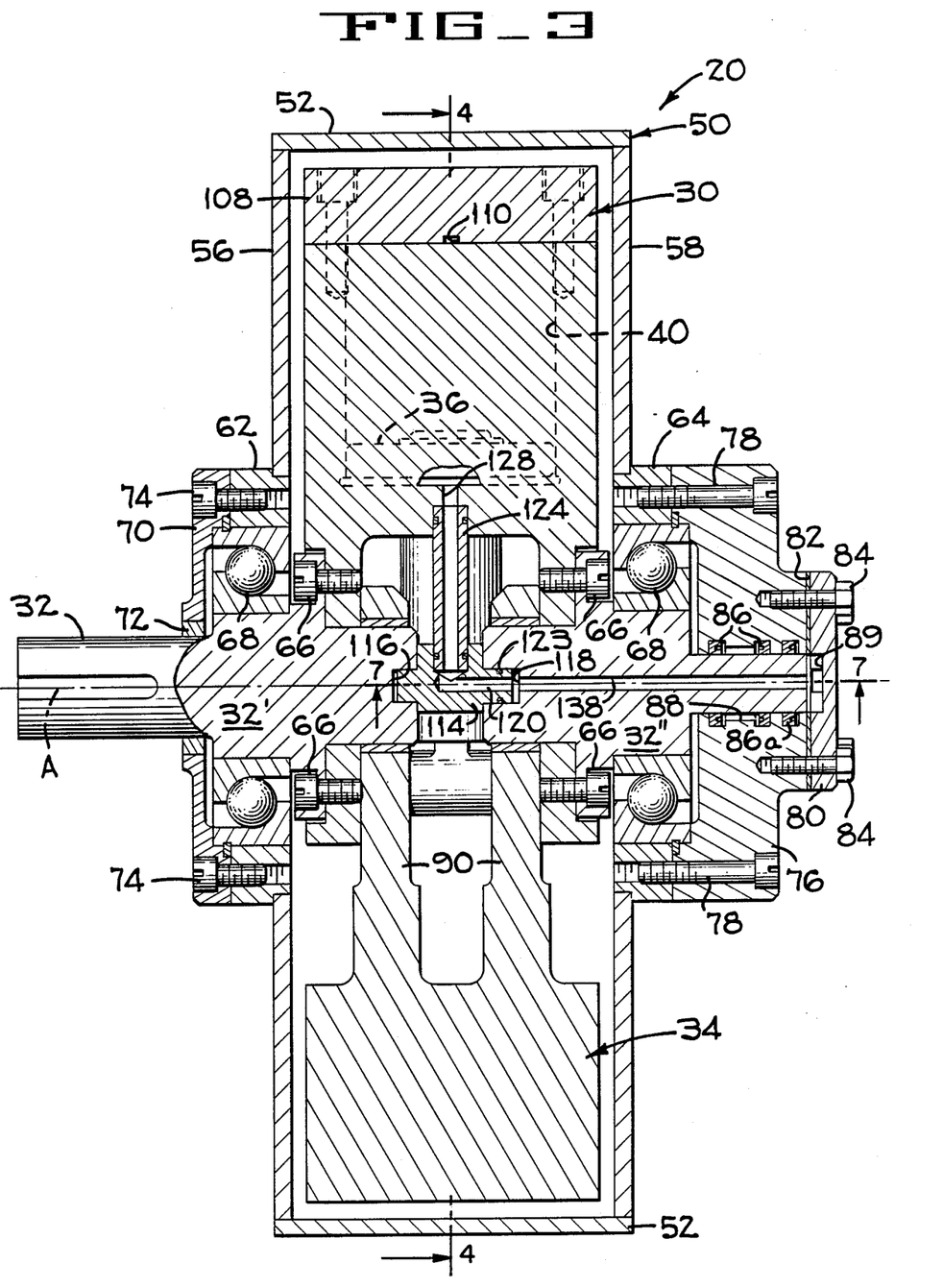
FIG. 3 is a central section taken through one of the shaker heads showing the eccentric masses in balanced position.

More particularly, the first embodiment of the variable shaking head 20 (FIGS. 1-8) includes a housing 60 illustrated as an annular housing 50 which is non-rotatable, is rigidly secured to the shaking assembly 22 (FIG. 1), and is concentric about the axis A (FIGS. 2 and 3) of the two piece shaft 32, which shaft includes stub shafts 32' and 32" (FIG. 3). The housing 50 includes a cylindrical outer wall 52. A pair of mounting rings 56,58 are rigidly secured to the cylindrical wall 52 and to bearing support flanges 62,64 as by welding, which flanges may be considered a part of said housing 50. The one piece housing 50 is relatively small (about 17 inches in diameter) and is of welded construction, but the two piece shaft 32 and components attached to the shaft can easily be assembled within the housing 50 through openings or access means (not shown).

The fixed weight 30 is rigidly connected to flanges of the stub shafts 32',32" by a plurality of capscrews 66, only four being shown in FIG. 3. Ball bearings 68 are seated on large diameter portions of their associated stub shafts 32',32" and within the bearing support flanges 62,64, respectively. A bearing cap 70, having a shaft seal 72 fitted thereto is rigidly secured to the associated bearing support flange 62 by a plurality of capscrews 74, only two being shown. A second bearing cap 76 is rigidly secured to the support flange 64 by a plurality of capscrews 78 (only two being shown) and maintains the associated bearing 68 in engagement therewith. An end cap 80 and seal ring 82 are secured to the bearing cap 76 by a plurality of capscrews 84; and a plurality of hydraulic seals 86 and 86a are positioned between a reduced diameter portion of the shaft 32" and the bearing cap 76. An annular fluid receiving passage 88 and clearance 89 in cap 80, forms a part of the hydraulic circuit to be described hereinafter.

As best shown in FIGS. 3-6, the adjustable counterweight 34 includes a pair of arms 90 rotatably received on the associated ends of the stub shafts 32',32". The arms 90 are pivotally connected to one end of the connecting rods 44,46 (FIGS. 4 and 5) by pins 91 and the other ends of the rods are pivotally connected to a bifurcated end of piston plugs 92,94 by pivot pins 96,98, respectively. Elongated sleeves 100,102 are attached or integral with pistons 36 and 38 and surround a major portion of the associated connecting rods. The sleeves 100,102 are slidably received in fluid sealed engagement to ports 104,106 and guide the pistons when they are moved between the balanced positions shown in FIG. 4 and the maximum out of balance position shown in FIG. 5.

It will be noted that the piston sleeves 100,102 have a large diameter and therefore act as cross heads for absorbing side thrust, and that the connecting rods 44,46 are disposed within the sleeves thereby making it possible to minimize the overall diameter of the shaking head 20. Minimizing the diameter allows shaker heads to be mounted closer to the centerline of the tree, thereby minimizing rotational moments that may damage the bark. It will also be noted that a stop bar 107 (FIGS. 4 and 5) is bolted to the fixed weight to stop the adjustable weight in its balanced position when moved to its maximum extent in a counterclockwise direction (FIG. 4).

As shown in FIGS. 2, 4 and 5, a cylinder head 108 is bolted to the upper portion of the fixed weight 30, and has an air flow passage 110 therein which allows air to flow directly between the outer ends (FIG. 4) of the cylinders 40,42. By recycling air between the two cylinders air from the outside, which is likely to contain contaminates, is not drawn into the cylinders.

The fluid trapped in the cylinders is actually slightly compressible and functions as a very stiff spring to keep the moveable counterweight in the desired position. The resulting spring-mass system has a natural frequency of vibration. One important factor in the success of the variable WR shaker head is that the natural frequency of this spring-mass system be kept well above the operating frequency of the shaker. Otherwise, destructive resonant vibration may occur.

If air gets into the fluid in the cylinders, it greatly reduces the bulk modulus (stiffness) of the fluid, which lowers the natural frequency of the system and may result in the destructive resonance mentioned above. One important feature of this invention is to provide means for purging air trapped in the cylinders or supply passages.

The self-purging feature is obtained by pressurizing only the undersides of the pistons and having the supply passages drain toward the axis of rotation, with no pockets where air can accumulate. Centrifugal force then causes any entrapped air to drain or be forced to the axial passages in the stub shaft 32''. When the pistons 36 or 38 are stroked in the appropriate direction, the entrained air will be expelled with the discharged hydraulic fluid.

As best illustrated in FIGS. 3, 4, 7 and 8, internal hydraulic fluid flow passages are provided for directing fluid into the cylinders 40,42 in selected directions in response to actuation of controls such as that illustrated in FIG. 9.

The internal hydraulic circuit includes circuit blocks 114 (FIGS. 3 and 4) which are fitted into cavities 116 in stub shaft 32' and ports 118 in stub shafts 32''. The circuit blocks have passages 120,122 (FIGS. 3 and 4) formed therein and are sealed by a pair of O-ring seals 123 fitted within bores 118 in the stub shaft 32''. A pair of tubes 124,126 having O-ring seals therein each have one end seated in fluid tight engagement with associated passages 120,122, and have their other ends seated in fluid tight engagement to enlarged portions of passages 128,130 in the fixed weight 30, which passages enter cylinders 40,42, respectively.

When hydraulic fluid is directed into a conduit 132 (FIGS. 7 and 8) in the direction of the arrows, fluid flows through passages 134,136, a passage 89 in end cap 80, a passage 138 in shaft 32'', the passage 120, through the tube 124 and passage 128 (FIG. 4) thereby urging the piston 36 upwardly (FIG. 4). Seal 86a (FIG. 3) prevents leakage along shaft 32''. Fluid below piston 38 is then forced through passage 130, tube 126, and passage 122. The fluid then enters a passage 140 (FIGS. 7 and 8) and a passage 142 for eventual discharge to tank T (FIG. 9) through a conduit 144.

It will be noted that a plug 146 (FIG. 7) prevents fluid from flowing from passage 140 into the passage 89 in end cap 80. It will also be noted that the fluid seals 86 and an annular groove 88 in the housing cap 76 allows the stationary housing to direct fluid into or out of passage 140 in the rotatable shaft with a minimum of leakage. Since the working diameter of the seals 86 and 86a is small, the surface speed and wear is minimized.

FIG. 9 illustrates a simplified hydraulic diagram 148 for operating the first embodiment of the variable force shaker head 20 of the present invention. The diagram illustrates only the circuitry for adjusting the movable weight 34 between its balanced position (FIG. 4) and its several imbalanced positions, only the maximum imbalanced position being shown in FIG. 5. The circuitry for controlling the rate of rotation of the weights is conventional in the art and accordingly is not described herein.

The hydraulic diagram 148 includes a pump P which draws hydraulic fluid from a tank T. A valve V, when in its illustrated centered position, directs fluid through conduit 150, a passage 152 in the core of valve V and conduit 154 to tank T. When it is desired to move the adjustable weight 34 (FIG. 4) from its illustrated balanced position to anywhere between the balanced position and the maximum imbalanced position, the valve V is shifted to its parallel passage position causing hydraulic fluid to flow through conduit 150 a parallel passage in valve V and a conduit 156 causing the piston 36 to move upwardly (FIG. 9). Air above the piston 36 flows out of the cylinder 40, through conduit 158 and into the upper end of cylinder 42. Hydraulic fluid and air (if any) below piston 38 flows through conduit 160, a parallel passage in valve V and returns through conduit 154 to tank T.

When it is desired to return the adjustable weight 34 to its balanced position the valve V is shifted to its cross passage position causing hydraulic fluid to flow through conduit 150, a cross passage in valve V, and conduit 160 into the cylinder 42 below the piston 38 forcing air above the piston 38 through conduit 158 into the upper end of cylinder 40. Hydraulic fluid below the piston flows through conduit 156, a cross passage in valve V and conduit 154 to tank T. A pilot operated pressure relief valve 157 opens when pressure in conduit 150 exceeds a predetermined amount thereby returning fluid to tank T.

Thus, in order to apply a shaking force to the tree, the core of valve V is moved to the right (FIG. 9) thereby moving the pistons 36,38 anywhere between their illustrated balanced positions and the maximum imbalanced position shown in FIG. 5 while the shaft is rotating at any speed within the speed range of the shaker.

During operation of the shaker assembly 22 (FIG. 1), the tree trunks 26, or limbs, of the tree are firmly gripped by the clamps 24 which are closed by conventional hydraulic power means (not shown), which provides a minimum of pressure of about 700 psi when clamping a tree up to about 4 inches in diameter to a maximum pressure of about 2400 psi when clamping a tree having a diameter over 12 inches. Each tree is gripped when the fixed weight 30 and the adjustable weight 34 are in their balanced, non-shaking position as illustrated in FIG. 4. Once the shaker heads 20 are at the desired speed, or if they are already rotating, the operator opens valve V causing the pistons 36,38 to move the adjustable weight the desired amount.

However, other modes of operation are possible. For example, if counterweight displacement is increased, the speed can be reduced providing a constant force (or a constant horse power) variable frequency, shake. Changing frequency will change the nodal points of the branches, thus improving produce removal. Also, by starting at a higher speed, amplitude is reduced for a given acceleration force, so that hard to remove produce in close proximity to branches will be subject to even less predetachment damage.

Figures 10, 11, 12:
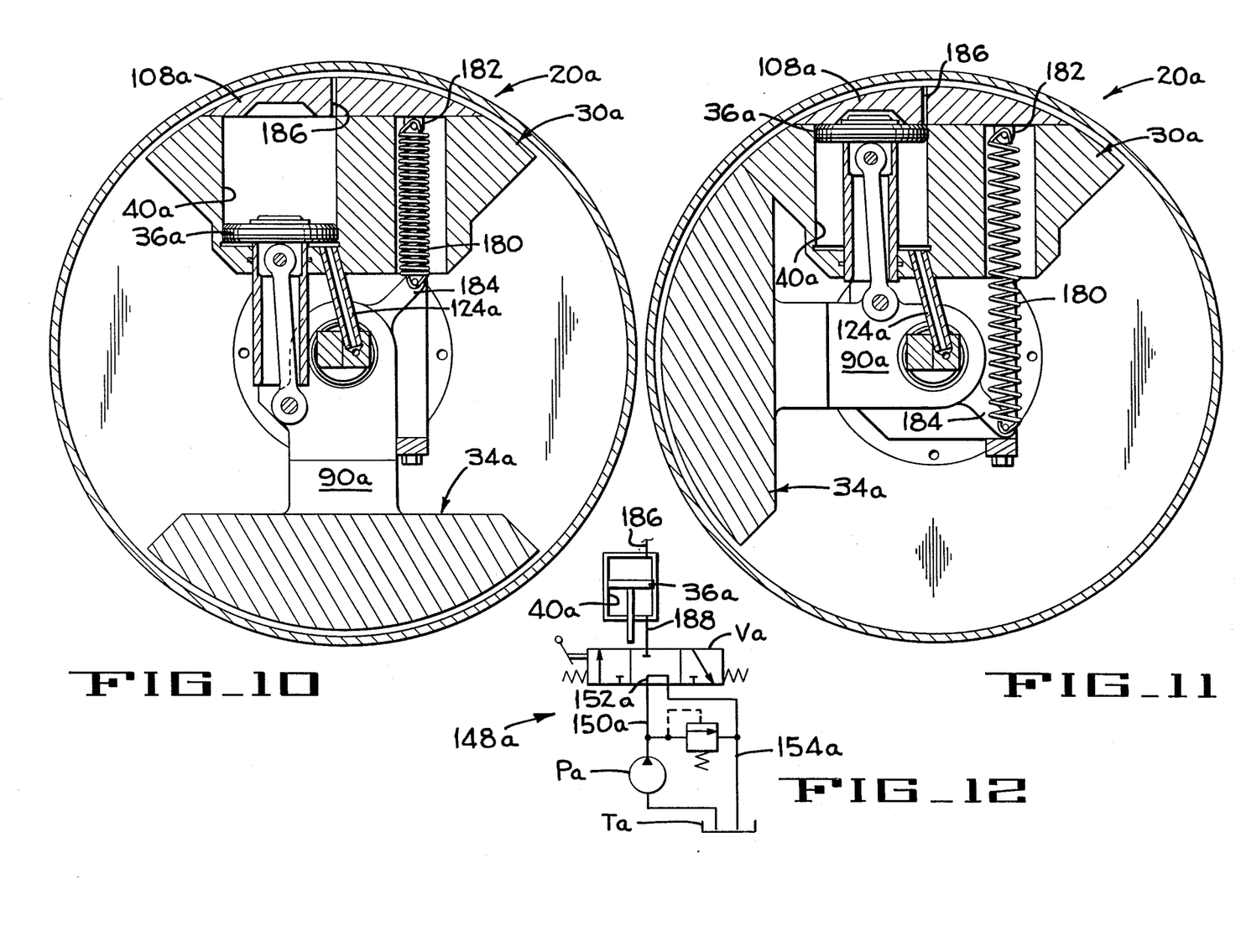
FIG. 10 is a section similar to FIG. 4 but showing a second em of the invention with the movable weight in balance, and with one piston and a single acting cylinder with a strong spring to return the movable weight to the balanced position.
FIG. 11 is a section similar to FIG. 10 but illustrating the movable weight in its fully imbalanced position.
FIG. 12 is a hydraulic diagram for operating the shaker of FIGS. 10 and 11.

A second embodiment of the variable force shaking head 20a of the invention is illustrated in FIGS. 10-12 which differs from the first embodiment in that a single piston 36a and a single acting cylinder 40a are provided for shifting the adjustable weight 34a to any one of a plurality of positions relative to a fixed weight 30a between a balanced position illustrated in FIG. 10 and the fully imbalanced position illustrated in FIG. 11. Accordingly, the components of the second embodiment which are equivalent to those of the first embodiment will be identified by the same numerals followed by the letter "a".

As illustrated in FIGS. 10 and 11, a spring 180 is connected between a bracket 182 on the cylinder head 108a and a lever 184 secured to arms 90a of the adjustable counterweight 34a. An air passage or vent 186 is drilled in the head 108a to allow air to be drawn into or be expelled from the single acting cylinder 40a.

The circuit 148a (FIGS. 10-12) differs from the circuit 148 (FIGS. 7, 8 and 9) of the first embodiment in that all hydraulic fluid flows into and out of the cylinder 40a through the same conduits. This eliminates the need for about half of the conduit systems disclosed in FIGS. 5, 7 and 8 of the first embodiment. Thus, the circuit 148a requires a single angled tube 124a, and only one half of the passages illustrated in FIG. 7. This conduit system then includes equivalents of the conduit components 132, 134, 136, 138, 120, 124, 89 and 128 (FIGS. 3, 4, 7 and 8) of the first embodiment. This group of conduits are assigned numerals 188 in FIG. 12.

Having reference to FIG. 12, a pump Pa draws hydraulic fluid from a tank Ta and directs fluid through a conduit 150a, a passage 152a in the core of valve Va for return to tank Ta through conduit 154a when the core is in its illustrated centered position. When the valve core is shifted to the right into the parallel passage position, hydraulic fluid from line 150a flows through the parallel passage and conduit 188 into the cylinder 40a thereby moving the piston upwardly and expelling air from the cylinder through the air passage 186. The moveable weight 34a is thereby moved from its balanced position to any one of a plurality of imbalanced positions.

It will of course be understood that the mass of the adjustable weight 34a is in balance with the fixed weight 30a plus the fluid and components attached thereto when positioned as shown in FIG. 10.

It will also be understood that the weight 34a has a natural tendency to move to the balanced position, which is its condition of least energy, when the shaking head is rotating. Thus, in the single piston embodiment, the return spring 180 may be eliminated if desired.

Figures 13, 14, 15, 16:
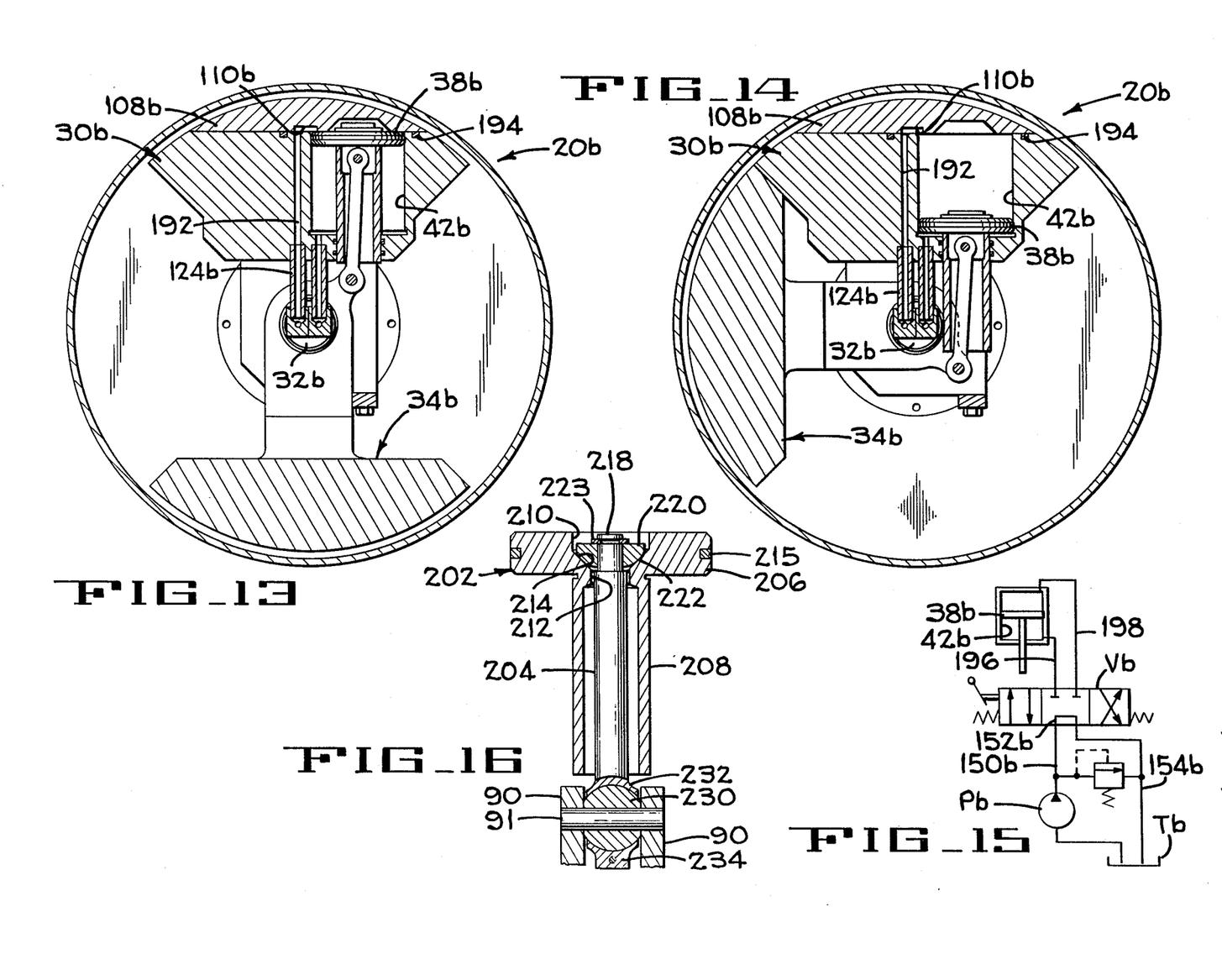
FIG. 13 is a section similar to FIG. 10 of a third embodiment of the invention but illustrating a single double acting cylinder system which is controlled only by the hydraulic fluid, said view illustrating the movable weight hydraulically locked in its balanced position.
FIG. 14 is a section similar to FIG. 13 but illustrating the movable weight hydraulically locked in its position of maximum imbalance.
FIG. 15 is a simplified hydraulic diagram for operating the shaker of FIGS. 13 and 14.
FIG. 16 is a central section of a modified piston and piston rod having omni-directional joints at both ends.

A third embodiment of the variable force shaking head 20b of the present invention is illustrated in FIGS. 13-15 which utilizes a double acting cylinder without a return spring.

The shaking head 20b includes a fixed weight 30b secured to a two piece shaft 32b and an adjustable weight 34b supported for pivotal movement about the axis of the shaft 32b. A single piston 38b is received in a double acting cylinder 42b. A cylinder head 108b is a portion of the fixed weight and has a fluid flow passage 110b therein which communicates with the cylinder 42b and with a passage 192. A fluid seal 194 is positioned between the piston head and the lower portion of the fixed weight 30b.

Since the components of the hydraulic circuit within the head 20b is the same as that of the first embodiment except that the tube 124b communicates with the passage 192 rather than a second cylinder, the internal circuit will not be described in detail.

In operation, hydraulic fluid is drawn from tank Tb (FIG. 15) by pump Pb and returns to tank Tb when valve Vb is in its centered position. When it is desired to move the adjustable weight 34b to any of a plurality of imbalanced positions such as the fully imbalanced position of FIG. 14, the valve Vb is shifted to the left causing fluid to flow from conduit 150b, through a cross passage in the core of valve Vb, through conduit 198 and into the upper end (FIG. 15) of cylinder 42b thereby directing fluid below the piston 38b through conduit 196, a cross passage in valve Vb and conduit 154b to tank Tb.

When the valve Vb is shifted to the right into its parallel passage position, hydraulic fluid from line 150b flows through a parallel passage and conduit 196 into the bottom of cylinder 42b thereby moving the piston 38b upwardly and the adjustable weight to or toward the balanced position illustrated in FIG. 13. Hydraulic fluid above the piston flows through a conduit 198, through a parallel passage in valve Vb and returns to tank Tb through conduit 154b.

FIG. 16 illustrates a second embodiment of a piston 202 and connecting rod 204 which provides more flexibility and may be used in the first two embodiments of the invention.

The piston 202 includes an annular head 206 which is formed integrally and concentric with an elongated sleeve 208. The central portion of the head is machined to provide a large outer opening 210 and a small inner opening 212 interconnected by a frusto-conical bearing surface 214. An annular seal 215 is fitted in a groove in the periphery of the head.

The connecting rod 204 is partially received within the sleeve 208 and has a reduced diameter upper end portion 218 which is loosely received within the small inner opening 212. An annular connector 220 having a frusto-spherical surface 222 which engages the frusto-conical surface 214 is locked to the upper end portion 218 of the connecting rod 204 by a snap ring 223 and a cooperating groove in the rod. The frusto-conical surface 214 and the frusto-spherical surface 222 permits omni-directional movement between the circular head and the connecting rod.

The lower end of the connecting rod 204 is connected to a pin, such as either pin 91 (FIG. 4), which rotatably receives a truncated sphere 230. An upper truncated spherical connector 232 (FIG. 16) is secured to the lower end of the connecting rod; and a lower truncated spherical cap 234 is bolted to the connector 232 for limited pivotal movement about the truncated spherical connector 230 in any direction thereby precluding binding of the piston 202 within an associated cylinder.

From the foregoing description it is apparent that three embodiments of a variable force shaking head are disclosed. Each head includes a fixed weight and an adjustable weight, which adjustable weight may be moved between a balanced and an imbalanced position while the weights are rotating about a central axis. Accordingly, the clamping jaws of the shaking assembly may be clamped and unclamped from the tree when the weights are in their balanced position, and while the shaft is being rotated at any desired speed without damage to the bark of the tree. Thus, the shaking heads of the present invention need not be stopped and thereafter started each time a tree is to be clamped and unclamped. Also soft fruit may be selectively harvested by varying the position of the adjustable weight while the weights are rotating at a constant speed or at variable speeds. Furthermore, the WR, which is the product of the weight or mass times the radius to the center of gravity of the mass, may be changed before or during the shaking cycle to obtain optimum produce detachment conditions. As used in the specification and claims, the term "variable force" is intended to cover "WR".

Although the best mode contemplated for carrying out the present invention has been herein shown and described, it will be apparent that modification and variation may be made without departing from what is regarded to be the subject matter of the invention.

What is claimed is:

1. A variable force shaking head comprising:
   means for rotating an eccentrically weighted member about the axis of a shaft;
   means for supporting an adjustable weight on said shaft for pivotal movement about the axis of said shaft;
   means defining at least one hydraulic cylinder in said eccentrically weighted member;
   means defining a piston in said cylinder and having a connecting rod connected to said adjustable weight; and
   controllable hydraulic power means for directing fluid into said cylinder for controllably moving said adjustable weight about said axis between a position in balance with said eccentrically weighted member for precluding shaking of said shaking head while rotating, and to any one of a plurality of positions out of balance with said eccentrically weighted member for causing said shaking head to shake about said axis when rotating.

2. An apparatus according to claim 1 wherein said controllable hydraulic power means precludes movement of a piston means and said adjustable weight relative to said eccentrically weighted member when said controllable hydraulic power means precludes movement of hydraulic fluid into or out of said cylinder means.

3. An apparatus according to claim 1 wherein said variable force shaking head additionally comprises a clamping and shaking assembly supporting said rotatable shaft and adapted to be clamped to a tree, and power means supported by said assembly for driving said shaft, said clamping and shaking assembly being clamped to said tree when said movable weight is in said balanced position thereby precluding shaking of the tree while being clamped and until the shaft is at desired speed, and causing the tree to be shook with progressively greater force as said adjustable weight is moved away from said balanced position.

4. An apparatus according to claim 1 wherein the product of said fixed weight multiplied by the radius between the center of gravity of the fixed weight and the axis of said shaft is the WR of said fixed weight, and wherein said adjustable weight has the same WR as that of the fixed weight and components therein and attached thereto.

5. A variable force shaking head comprising:
   means for rotating an eccentrically weighted member about the axis of a shaft;
   means for supporting an adjustable weight on said member;
   means defining at least one hydraulic cylinder in said eccentrically weighted member;
   means defining a piston in said cylinder and having a connecting rod connected to said adjustable weight; and
   controllable hydraulic power means for directing fluid into said cylinder for controllably moving said adjustable weight about said axis between a position in balance with said eccentrically weighted member for precluding shaking of said shaking head while rotating, and to any one of a plurality of positions out of balance with said eccentrically weighted member for causing said shaking head to shake about said axis when rotating, wherein a pair of hydraulic cylinders and pistons are provided in said eccentrically weighted member, and wherein said controllable hydraulic power means may be controlled to hydraulically lock said movable weight in any one of a plurality of positions relative to said eccentrically weighted member while said member is rotating.

6. A variable force shaking head comprising:
   means for rotating an eccentrically weighted member about the axis of a shaft;
   means for supporting an adjustable weight on said member;
   means defining at least one hydraulic cylinder in said eccentrically weighted member;
   means defining a piston in said cylinder and having a connecting rod connected to said adjustable weight;
   controllable hydraulic power means for directing fluid into said cylinder for controllably moving said adjustable weight about said axis between a position in balance with said eccentrically weighted member for precluding shaking of said shaking head while rotating, and to any one of a plurality of positions out of balance with said eccentrically weighted member for causing said shaking head to shake about said axis when rotating;
   a non-rotatable housing surrounding said eccentrically weighted member and said adjustable weight; and
   an elongated sleeve connected to said piston, and wherein a major portion of said connecting rod is disposed within said sleeve for minimizing the diameter of said eccentrically weighted member and said adjustable weight.

7. An apparatus according to claim 6 wherein said shaft includes a small diameter portion which is journaled in said annular housing; means defining fluid passages between said hydraulic cylinder, said annular housing, and said shaft; means defining rotary hydraulic seals between said annular housing and said shaft whereby the small working diameter of said rotary seals reduces the surface speed of said shaft thereby minimizing wear.

8. A variable force shaking head comprising:
   means for rotating an eccentrically weighted member about the axis of a shaft;
   means for supporting an adjustable weight on said member;
   means defining at least one hydraulic cylinder in said eccentrically weighted member;
   means defining a piston in said cylinder and having a connecting rod connected to said adjustable weight;
   controllable hydraulic power means for directing fluid into said cylinder for controllably moving said adjustable weight about said axis between a position in balance with said eccentrically weighted member for precluding shaking of said shaking head while rotating, and to any one of a plurality of positions out of balance with said eccentrically weighted member for causing said shaking head to shake about said axis when rotating, said at least one hydraulic cylinder being a single acting hydraulic cylinder which includes a cylinder head; and
   a spring disposed between said cylinder head and said adjustable weight for moving said adjustable weight from said imbalance position to said balanced position.

9. A variable force shaking head comprising:
   means defining a non-rotatable housing;

means defining a rotatable shaft rotatable about an axis and journaled in said housing;
means defining a fixed weight eccentrically secured to said shaft and having at least one cylinder therein:
means defining a piston in said at least one cylinder;
means defining ann adjustable weight pivotally supported on said shaft and operatively connected to said piston for movement about said axis between a position in balance with said fixed weight for providing shake free rotation of said shaking head, and a plurality of unbalanced positions for providing a plurality of shaking forces of different magnitude while the shake is driven;
means defining flow passages in said housing means, said shaft means and said fixed weight for establishing flow communication in both directions from said non-rotatable housing means to at least one end of said at least one cylinder means; and
hydraulic power means for controllably and selectively directing hydraulic fluid into said at least one cylinder means while said shaft is rotating for moving said movable weight between a balanced position for providing shake free rotation of the shaking head, and a plurality of shaking forces of different magnitude while the shaking head is being driven.

10. An apparatus according to claim 9 wherein a single cylinder is provided in said fixed weight.

11. An apparatus according to claim 9 and additionally comprising: a clamping and shaking head adapted to be clamped to a tree, means for rotatably supporting a pair of said variable force shaking heads on said clamping and shaking head, and drive means supported by said clamping and shaking head for driving said pair of variable force shaking heads.

12. An apparatus according to claim 11 wherein said clamping and shaking head is clamped to and unclamped from a tree while the shaft is being driven at a shaking speed and the movable weight is in said balanced position thereby precluding shaking of the tree during the tree clamping and unclamping operation.

13. A variable force shaking head comprising:
means defining a non-rotatable housing;
means defining a rotatable shaft journaled in said housing;
means defining a fixed weight secured to said shaft and having at least one cylinder therein;
means defining a piston in said at least one cylinder;
means defining an adjustable weight pivotally supported on said shaft and operatively connected to said piston for movement between a position in balance with said fixed weight for providing shake free rotation of the shaking head, and a plurality of unbalanced positions for providing a plurality of shaking forces of different magnitude while the shaft is driven;
means defining flow passages in said housing means, said shaft means and said fixed weight for establishing flow communication in both directions from said non-rotatable housing means to at least one end of said at least one cylinder means; and
hydraulic power means for controllable and selectively directing hydraulic fluid into said at least one cylinder means while said shaft is rotating for moving said movable weight between said balanced position for providing shake free rotation of the shaking head, and a plurality of imbalanced positions for providing a plurality of shaking forces of different magnitude while the shaking head is being driven, wherein two cylinders are provided in said fixed weight means and pistons are provided in each cylinder with each piston being operatively connected to said adjustable weight.

14. A variable force shaking head comprising:
means defining a non-rotatable housing;
means defining a rotatable shaft journaled in said housing;
means defining a fixed weight secured to said shaft and having at least one cylinder therein;
means defining a piston in said at least one cylinder, said at least one cylinder being a single cylinder including a cylinder head in said fixed weight;
means defining an adjustable weight pivotally supported on said shaft and operatively connected to said piston for movement between a position in balance with said fixed weight for providing shake free rotation of the shaking head, and a plurality of unbalanced positions for providing a plurality of shaking forces of different magnitude while the shaft is driven;
means defining flow passages in said housing means, said shaft means and said fixed weight for establishing flow communication in both directions from said non-rotatable housing means to at least one end of said at least one cylinder means;
hydraulic power means for controllably and selectively directing hydraulic fluid into said at least one cylinder means while said shaft is rotating for moving said movable weight between said balanced position for providing shake free rotation of said shaking head, and a plurality of imbalanced positions for providing a plurality of shaking forces of different magnitude while the shaking head is being driven; wherein a single cylinder having a cylinder head is provided in said fixed weight, and additionally comprising a spring connected between said cylinder head and said adjustable weight for moving said adjustable weight from an imbalanced position to a balanced position.

15. An apparatus according to claim 14, wherein the product of the weight of the fixed weight multiplied by the radius between the center of gravity of the fixed weight and the axis of said shaft is the WR of that weight, and wherein said adjustable weight has the same WR as that of the fixed weight and components therein and attached thereto.

16. A variable force shaker head comprising:
means defining a non-rotatable housing;
means defining a rotatable shaft journaled in said housing and having an axis;
means defining a fixed weight rigidly secured to said shaft and having at least one double acting cylinder therein;
means defining a piston in said at least one cylinder;
means defining an adjustable weight pivotally supported on said shaft and operatively connected to said piston for movement between a position in balance with said fixed weight for providing shake free rotation of said head, and a plurality of imbalanced positions for providing a plurality of shaking forces of different magnitude while the shaft is driven;
means defining flow passages in said housing means, said shaft means and said fixed weight for establishing flow communication in both directions from said non-rotatable housing means to opposite ends of said at least one cylinder means; and hydraulic power means for controllably and selectively directing hydraulic fluid into said at least one cylinder means while said shaft is rotating for moving said movable weight between said balanced position for providing shaker free rotation of the shaking head, and a plurality of imbalanced positions for providing a plurality of shaking forces of different magnitude while the shaker is being driven.

17. An apparatus according to claim 16 wherein the product of the weight of the fixed weight multiplied by the radius between the center of gravity of the fixed weight and the axis of said shaft is the WR of that weight, and wherein said adjustable weight has the same WR as that of the fixed weight and components therein and attached thereto.

18. A variable force shaking head:

means for rotating an eccentrically weighted member about the axis of a shaft;

means for supporting an adjustable weight on said member;

means defining at least one hydraulic cylinder in said eccentrically weighted member;

means defining a piston in said cylinder and having a connecting rod connected to said adjustable weight; and controllable hydraulic power means for directing fluid into said cylinder for controllably moving said adjustable weight about said axis between a position in balance with said eccentrically weighted member for precluding shaking of said shaking head while rotating, and to any one of a plurality of positions out of balance with said eccentrically weighted member for causing said shaking head to shake about said axis when rotating; said connecting rod including frusto-conical surfaces on both ends thereof for providing multi-directional connections between said at least one piston means and said adjustable weight.

19. A variable force shaker head comprising:

means defining a non-rotatable housing;

means defining a rotatable shaft journaled in said housing;

means defining a fixed weight secured to said shaft and having at least one cylinder therein;

means defining a piston in said at least one cylinder having a connecting rod;

means defining an adjustable weight pivotally supported on said shaft and operatively connected to said piston for movement between a position imbalance with said fixed weight for providing shake free rotation of the shaking head, and a plurality of unbalanced positions for providing a plurality of shaking forces of different magnitude while the shaft is driven;

means defining flow passages in said housing means, said shaft means and said fixed weight for establishing flow communication in both directions from said non-rotatable housing means to at least one end of said at least one cylinder means; and hydraulic power means for controllably and selectively directing hydraulic fluid into said at least one cylinder means while said shaft is rotating for moving said movable weight between said balanced position for providing shake free rotation of the shaking head, and a plurality of imbalanced positions for providing a plurality of shaking forces of different magnitude while the shaker is being driven; wherein said connecting rod includes frusto-spherical surfaces on both ends thereof for providing multi-directional connections between said at least one piston means and said adjustable weight.

20. A variable force shaking method which comprises steps of:

rotating an eccentrically weighted member secured to a shaft about the axis of the shaft with the eccentrically weighted member having at least one piston and cylinder therein;

pivotally supporting an adjustable weight on the shaft;

connecting the piston to said adjustable weight and selectively directing hydraulic fluid into said at least one cylinder for pivoting the adjustable weight about said axis between a position in balance with the eccentrically weighted member for precluding shaking about said axis when the shaft is rotating, and a plurality of selected imbalanced positions about said axis for imparting shaking forces of different intensities to said shaft.

21. A method according to claim 20 and additionally comprising the steps of journaling said shaft on a clamping and shaking assembly, clamping said assembly to a tree while the shaft is rotating and when the adjustable weight is in said balanced position for precluding shaking about said axis and damage to the tree, and moving the adjustable weight into any one of a plurality of selected imbalanced positions after the tree is clamped for controllably imparting shaking forces of different intensities to the tree.

22. A variable force shaking method which comprises the steps of:

rotating an eccentrically weighted member secured to a shaft about the axis of the shaft with the eccentrically weighted member having at least one piston and cylinder therein;

pivotally supporting an adjustable weight on the shaft;

connecting the piston to said adjustable weight; and selectively directing hydraulic fluid into said cylinder for moving the adjustable weight between a position in balance with the eccentrically weighted member for precluding shaking about said axis when the shaft is rotating, and a plurality of selected imbalanced position about said axis for imparting shaking forces of different intensities to the shaft, said at least one piston and cylinder including two pistons and cylinders.

23. A variable force shaking method which comprises the steps of:

rotating an eccentrically weighted member secured to a shaft about the axis of the shaft with the eccentrically weighted member having a single piston and a single acting cylinder therein;

pivotally supporting an adjustable weight on the shaft for pivotal movement about said axis;

connecting the single piston to said adjustable weight; and directing hydraulic fluid into said cylinder for pivoting the adjustable weight from an in balance position with the eccentrically weighted member which precludes shaking about said axis when the shaft is rotating to one of a plurality of imbalanced positions; and releasing the hydraulic fluid from said cylinder while the shaft is rotating from returning the adjustable weight to a position in balance with the eccentrically weighted member.

24. A variable force shaking method which comprises the steps of:
rotating an eccentrically weighted member secured to a shaft about the axis of the shaft with the eccentrically weighted member having a single piston and a single acting cylinder therein;
pivotally supporting an adjustable weight on the shaft;
connecting the piston to said adjustable weight;
directing hydraulic fluid into said cylinder for moving the adjustable weight from an imbalanced position with the eccentrically weighted member which precludes shaking about said axis when the shaft is rotating to one of a plurality of imbalanced positions;
releasing the hydraulic fluid from said cylinder while said shaft is rotating for returning the adjustable weight to a position in balance with the eccentrically weighted member; and
applying a resilient force between the eccentrically weighted member and the adjustable weight for returning the adjustable weight to said in balanced position when the hydraulic fluid is released from said cylinder.

* * * * *